United States Patent [19]

Lagergvist

[11] Patent Number: 5,306,454
[45] Date of Patent: Apr. 26, 1994

[54] CASTINGS WITH CAST-IN REINFORCEMENT

[75] Inventor: Conny Lagergvist, Karlskoga, Sweden

[73] Assignee: AB SKF, Gothenburg, Sweden

[21] Appl. No.: 791,326

[22] Filed: Nov. 14, 1991

[30] Foreign Application Priority Data

Nov. 19, 1990 [SE] Sweden ............... 9003673

[51] Int. Cl.$^5$ ............. B29C 45/14; B29C 39/10
[52] U.S. Cl. .................. 264/135; 264/235; 264/265; 264/271.1; 264/275; 264/279.1; 264/346
[58] Field of Search ............. 264/125, 126, 127, 131, 264/135, 275, 271.1, 279.1, 346, 259, 265, 235, 291, 279; 156/308.2, 308.4, 309.6

[56] References Cited

U.S. PATENT DOCUMENTS

| | | | |
|---|---|---|---|
| 2,324,863 | 7/1943 | Merchant | 384/797 |
| 2,701,392 | 2/1955 | Eich | 264/265 |
| 3,270,373 | 9/1966 | Jagger et al. | 264/275 |
| 3,352,955 | 11/1967 | Pigott et al. | 264/135 |
| 3,407,251 | 10/1968 | Elliot et al. | 264/135 |
| 3,598,896 | 8/1971 | Hassler et al. | 264/272.17 |
| 3,802,756 | 4/1974 | Turner | 384/206 |
| 3,844,030 | 10/1974 | Wilkinson | 264/135 |
| 3,991,146 | 11/1976 | Barrie | 264/275 |
| 4,065,190 | 12/1977 | Hallerback | 384/493 |
| 4,235,832 | 11/1980 | Leighton | 264/275 |
| 4,565,493 | 1/1986 | Hallerback | 416/24 R |
| 4,719,065 | 1/1988 | Gibbon | 264/135 |
| 4,764,424 | 8/1988 | Ganga et al. | 264/125 |
| 4,800,057 | 1/1989 | Rabe | 264/275 |
| 4,804,805 | 2/1989 | Antonas et al. | 264/272.13 |
| 4,877,469 | 10/1989 | Szyms et al. | 264/326 |

FOREIGN PATENT DOCUMENTS

| | | |
|---|---|---|
| 0368412 | 5/1990 | European Pat. Off. . |
| 1193326 | 11/1959 | France . |
| 806344 | 12/1958 | United Kingdom . |

OTHER PUBLICATIONS

Patent Abstracts of Japan, vol. 14, No. 164, Mar. 30, 1990, JP-A 2,024,118, Sekisui Chem. Col. Ltd.
Patent Abstracts of Japan, vol. 6, No. 208, Oct. 20, 1982, JP-A 57 116 728, Koushiyuuha Netsuren.

*Primary Examiner*—Jay H. Woo
*Assistant Examiner*—Duane S. Smith
*Attorney, Agent, or Firm*—Burns, Doane, Swecker & Mathis

[57] ABSTRACT

A casting is formed by inserting a metal reinforcement coil into a mold cavity and injecting a plastic casting material into the cavity such that the coil becomes embedded within the plastic casting material. Prior to being placed in the cavity, the coil is heat treated to relieve stresses therein, and a layer of plastic is sintered to the outer surface of the coil. Plastic is injected into the mold at a temperature lower than the heat-treating temperature, but hot enough to melt an outer portion of the layer and become joined therewith. An inner portion of the layer remains sintered to the coil.

12 Claims, 2 Drawing Sheets

CASTINGS WITH CAST-IN REINFORCEMENT

BACKGROUND OF THE INVENTION

The present invention relates to a device for forming castings such as a bearing seat for a bearing, a blower boss or a wheel boss, wherein a helical coil is embedded in the casting so that the thermal expansion coefficient of the bearing supporting portion of the casting is defined by the coil. The invention relates further to a manufacturing method for such castings and a coil per se to be used in combination with the device and the method.

Devices and methods of this kind are described in, for example, Swedish Patent 7405905-6 and U.S. Pat. No. 4,065,190 (corresponding to Swedish Patent 8202045-4) the disclosures of which are hereby incorporated by reference into the present description. The method of manufacturing the spring into a complete finished product will be briefly described. A steel wire having an untreated or treated surface, is folded and rolled to form a helical coil. The coil is then covered by a suitable plastic material which forms a bearing seat. During the warming-up of the coil surface by the plastic material, the stresses previously built into the coil by the folding and rolling steps begin to be released. This stress release starts at about 70° C. A normal material temperature of the plastic material is about 260° C. The stress release causes the coil to be gradually deformed, whereby its geometric dimensions become changed from those required of the coil in performing its intended function in the finished product.

In the injection casting mold the coil is kept in position by a coil retainer which is withdrawn shortly before the injection is terminated to create a cavity which is then filled with plastic, the coil being embedded within the plastic casting. The plastic material injected into the mold creates in the mold a pressure in the magnitude of 500 kg/cm$^2$ acting on the coil. Furthermore, the incoming plastic material speed is very high. The high pressure and high speed may cause the coil position to be changed, and also produce a somewhat uncontrollable movement of both coil ends. Due to the dimensional changes of the coil, and the pressure effect mentioned above, the coil can be moved in such a way that it is not situated in the desired position in the casting.

Prior to being placed in the mold, the coil surface is subjected to a conventional phosphatizing treatment to prevent corrosion. Also, prior to being formed into a coil, the wire is provided with some sort of lubrication on the surface thereof to facilitate the rolling-up into a coil. Therefore, it will be appreciated that even if the original wire had a clean surface, it is soiled after being manufactured into a coil. The greasy or unclean surface inhibits cast-in material from adhering to the coil.

A purpose of the present invention is to ensure that the cast-in coil retains its intended shape and position after injection.

Another purpose of the invention is to ascertain that a good adhesion is obtained between the coil and the castings.

SUMMARY OF THE INVENTION

These and other purposes of the invention have been achieved by a method comprising the steps of providing a metallic reinforcement member, sintering a layer of plastic material to a surface of the reinforcement member, Positioning the reinforcement member with that layer into a folded cavity, and introducing into the cavity a casting material. The casting material is introduced at a temperature sufficient to melt an outer portion of the layer-forming plastic material and joined as one-piece with the casting material to define a body in which the reinforcement member is embedded and to which the reinforcement member is sintered.

The present invention also involves a method comprising the steps of providing a metallic reinforcement member, heat-treating the reinforcement member at a selected temperature to relieve internal stresses therein, and applying a layer of material to a heat-treating reinforcement member. The reinforcement member with its layer of material is positioned in a mold cavity. A casting material is introduced into the cavity at a temperature lower than the selected temperature and high enough to melt an outer portion of the layer of material and join as one piece therewith. A casting is removed from the cavity in which the metallic reinforcement member is embedded in the casting material.

The present invention also involves a cast article comprising a metallic reinforcement member embedded in a casting material. The reinforcement member includes a layer of material sintered thereto. The sintered layer is joined as one piece with the casting material.

The present invention further involves a reinforcement member for being embedded in a cast article. The reinforcement member comprises a metallic coil having a layer of plastic material sintered thereto.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

A steel wire 10 is folded in a conventional manner and thereafter rolled up to form a helical coil or spring. Because of the folding step, the resulting coil 10 has its turns engaged with one another at circumferentially spaced positions during the subsequent rolling step. Such a characteristic enables the coil to thereafter be effectively embedded in a casting material.

After the rolling step, the coil 10 is heat treated at an elevated temperature at a magnitude of about 320° C. By this heat treatment, stresses previously incorporated in the coil during the folding and rolling steps are released from the coil, and the geometry and dimensions of the coil are thus maintained during subsequent heatings at lower temperatures. The dimensions initially given to the coil are chosen in light of the dimensional changes expected to occur during the heating treatment mentioned above.

The elevated temperature mentioned above is also chosen in such a way as to burn off all kinds of grease and other contaminants on the coil surface to promote adherence of the plastic to the coil surface.

Figure 5:
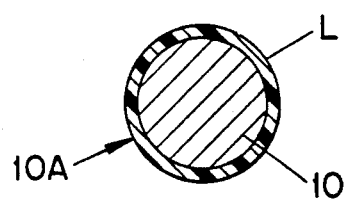
FIG. 5 is a cross-sectional view through the wire of the coil after a plastic layer has been sintered thereto.

After the heat treatment of the coil 10, a plastic layer L is sintered onto the coil, i.e., a thin plastic layer L is applied to the outside of the coil to form a layered coil 10A (see FIG. 5). This sintering can be achieved in different ways. According to one method, the heated metallic coil 10 is immersed in a pulverized plastic material. The thickness of the layer L is controlled by means of the immersing period. According to another method, plastic powder is sprayed onto the coil. The plastic powder adheres to the surface and melts.

The previously-described heat treatment is performed at a temperature (e.g., 320° C. in the example given above) adapted to match the sintering action. Also, the plastic layer comprises a material which is compatible with the casting material so that it can join therewith when melted in the mold. (Actually, an inner portion of the layer L is not melted and remains sintered to the wire 10.) In this way there is achieved an optimal anchoring of the layered coil 10A in the finished casting, and it is ensured that optimal functional features are obtained. The casting material is injected into the mold at a temperature which is lower than the above-mentioned heat treatment temperature, e.g., in the magnitude of about 260° C.

Prior to inserting the coil 10A into the mold, the sintered-on layer L serves, in effect, to weld the coil turns together at the positions where they engage each other. Furthermore, both free ends of the coil become locked. The thickness of the plastic layer L is chosen so as to maintain the presence of cavities between the coil turns.

In one example, the plastic layer L and the casting material can both be a polyamide, but any other plastic can be used, as long as the material of layer L is compatible with the casting material to enable the materials to join together as earlier explained. When necessary, the plastic can be reinforced in different ways, for example, by means of glass fibers. In a preferred application of the invention, the castings are manufactured by means of injection molding, the plastics being injected in a conventional manner in an injection casting mold comprising two parts 11, 12. Before injecting the plastic casting material 20, the layered coil 10A is placed into the molding tool 11, whereafter a number of coil retainers 14, 15 engage the layered coil 10A for keeping it in its position. The layered coil 10A is handled as a rigid inflexible element due to the presence of the sintering layer L. The shape of the coil cannot be altered without the sintering as a whole being destroyed. The molding tool 11 is then closed, whereafter the plastic is injected to fill the molding space. At a certain stage in the molding step, the retainers 14, 15 are withdrawn, the resulting cavity then being filled with plastic material.

When the plastic casting material has solidified, the molding tool is opened in a conventional manner in that a steering post is withdrawn backwards, whereby the core which forms the bearing surface is collapsed. At the same time, an outer core 16 is pulled in an outward direction, whereby the bearing casing 13 is exposed to be ejected.

It has been found that only the outer portion of the plastic layer is actually melted by the plastic casting material 20. The inner portion of the plastic layer L remains sintered to the coil wire 10. Thus, the outer portion of the original layer L becomes joined as one-piece with the casting material 20, while the inner portion of the original layer L remains sintered to the wire 10. Accordingly, the layer L and the casting material are united to form a plastic body in which the coil 10 is embedded, and wherein that body is sintered to the coil 10. The invention thus serves to maximize the adherence of the coil 10 to the surrounding plastic body.

Figure 1:
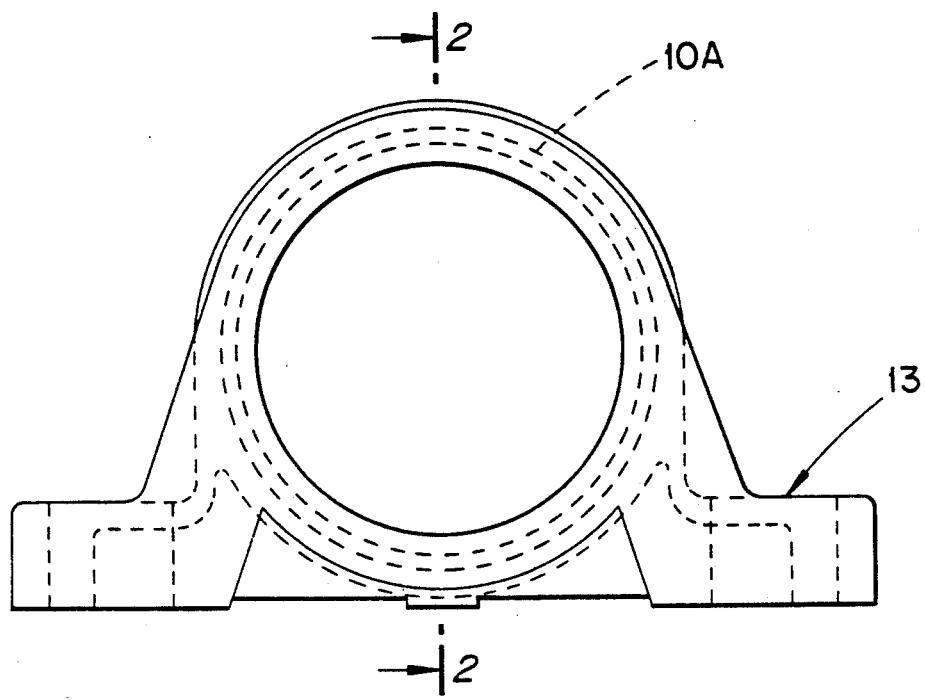
FIG. 1 is a side view of a bearing casing formed according to the present invention.
Figure 2:
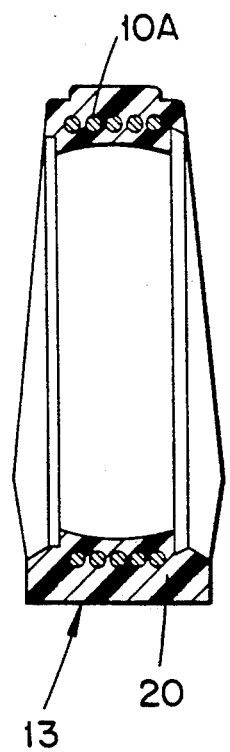
FIG. 2 is a longitudinal sectional view taken along the line 2—2 in FIG. 1.
Figure 3:
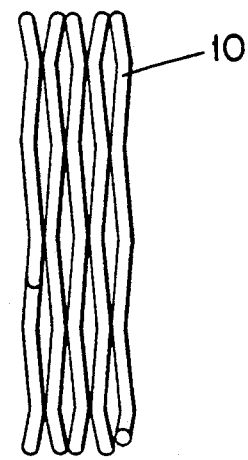
FIG. 3 is a side view of a coil adapted to be cast-in into the bearing casing of FIG. 1.
Figure 4:
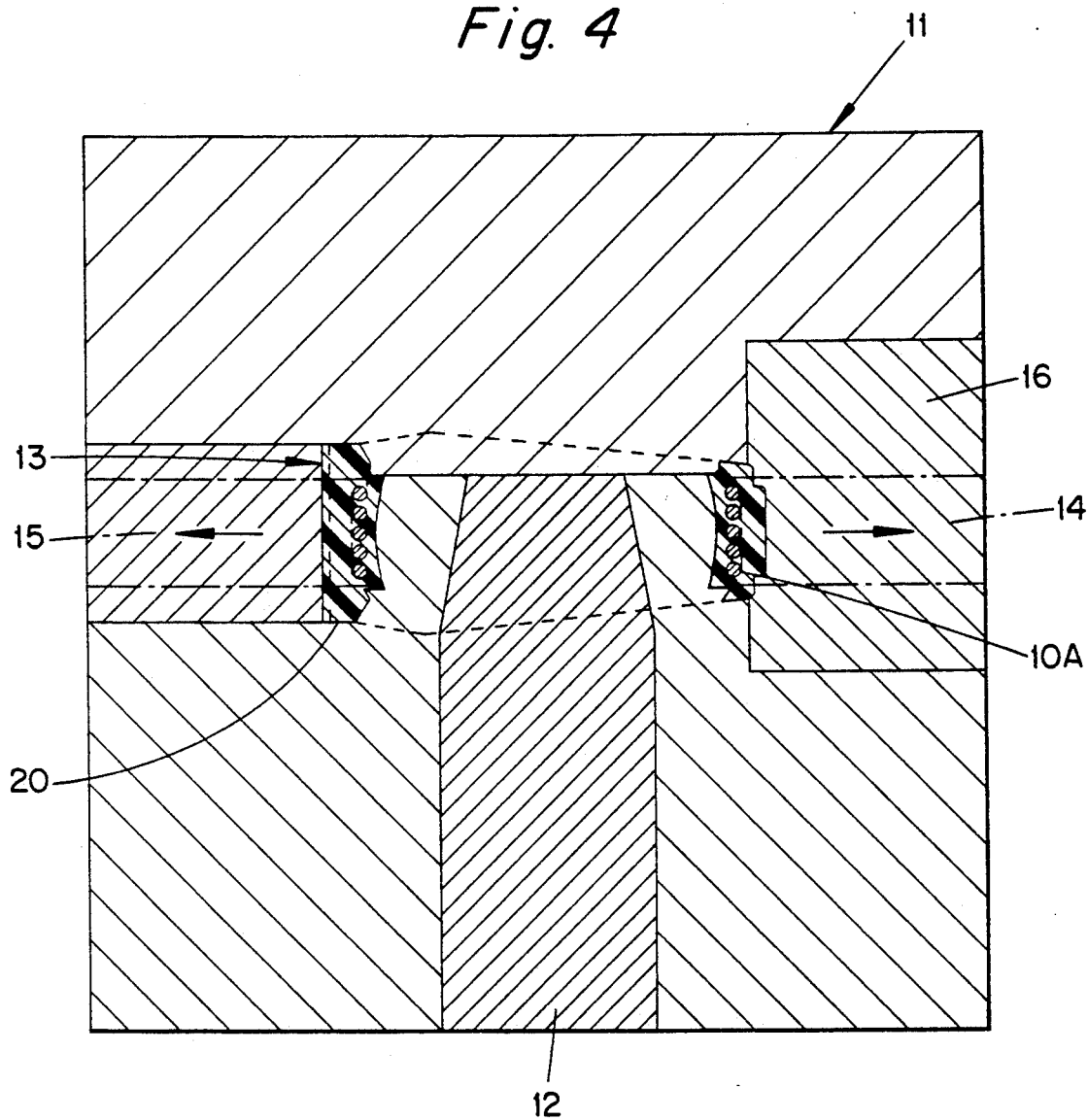
FIG. 4 is a sectional view of an injection casting mold adapted to form the bearing casing in FIG. 1.

As previously mentioned, the invention can be applied, for example, to so-called Y-bearing casings 13, as shown in FIG. 1 (see also U.S. Pat. No. 4,065,190 mentioned previously). Furthermore, the invention can be applied, for instance, to bosses of a blower and to bosses of wheels, as is shown in Swedish Application 8202045-4, also mentioned previously. The invention can be applied to other types of bearing casings as is apparent.

When sintering a plastic layer L onto relatively large coils, the coils are conveniently guided by a retainer during sintering to provide the coil with a perfect geometry and to lock it in the sintering position.

Furthermore, the coil can have various designs depending on the application in which it shall be used. It is, for instance, possible to extend both free ends of the coil and to use these as a prestressing reinforcement for the bearing foot in bearing casings and as an anchor plate 11 housings. Moreover, the coil ends can, for example, circumscribe mounting holes in the casting to reinforce them. It should also be possible to sinter different steel parts together, which thereafter can be cast in plastic.

In the illustrated embodiment, the reinforcement comprises a coil shape which defines perforations. It is, however, possible to use other types of configurations of reinforcement, for example, in the form of a perforated or solid cylindrical band, or a net, or other non-cylindrical shapes. When using a metallic net as a reinforcement for a bearing casing, an armoring is obtained both in the radial and axial directions.

Instead of plastic, other materials, such as rubber, plastic rubber, and casting metals such as zinc could be used as the layer L and/or the casting material. Thus, for example, the layer L could comprise plastic, and the casting material could comprise rubber, plastic rubber, or a casting metal such as zinc.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method of producing an article, comprising the steps of:
   providing a metallic reinforcement member containing a plurality of coils;
   sintering a thermoplastic layer to a surface of said coiled reinforcement member, thereby fusing together at least a portion of said coils;
   positioning said reinforcement member with said layer into a mold cavity; and
   introducing into said cavity a thermoplastic material at a temperature sufficient to melt an outer portion of said layer, said thermoplastic material and said melted outer portion of said thermoplastic layer becoming fused to define the article having embedded therein said reinforcement member, and to which said reinforcement member is sintered.

2. A method according to claim 1, including the step of heat treating said reinforcement member, prior to said sintering step, at a temperature sufficient to relieve internal stresses in said coil.

3. A method according to claim 2, wherein said thermoplastic material is introduced into said cavity at a temperature lower than said heat heating.

4. A method according to claim 3, wherein said heat treating is performed at a temperature of about 320° C., and said thermoplastic material is introduced at a temperature of about 260° C.

5. A method according to claim 1, wherein said introducing step comprises filling with thermoplastic a cavity shaped to form an articia having a central aperture, with said reinforcing member encircling said aperture.

6. A method according to claim 1, wherein the thermoplastic layer comprises a polyamide.

7. A method according to claim 1, wherein the thermoplastic material comprises a polyamide.

8. A method according to claim 1, wherein said reinforcement member includes folds in the turns of said coils, whereby folds in each said turn engage an adjacent said turn and wherein at least said engagements are fused together by said sintered thermoplastic layer.

9. A method of producing an article, comprising the steps of:
providing a metallic reinforcement member which has been shaped after forming and thereby has internal stresses;
heat treating said reinforcement member at a temperature sufficient to relieve said internal stresses;
applying a thermoplastic layer to a surface of said heat-treated reinforcement member;
positioning said reinforcement member having said thermoplastic layer in a mold cavity;
introducing into said cavity a thermoplastic material at a temperature lower than said heat treating temperature and high enough to melt an outer portion of said thermoplastic layer, said thermoplastic material and said melted outer portion of said thermoplastic layer becoming fused, thereby forming the article in which said reinforcement member is embedded; and
removing said article from said cavity.

10. A method according to claim 9, wherein the thermoplastic layer comprises a polyamide.

11. A method according to claim 9, wherein the thermoplastic material comprises a polyamide.

12. A method according to claim 9, wherein said reinforcement member comprises a coil and said article comprises a bearing housing.

* * * * *